Patented Apr. 26, 1938

2,115,053

UNITED STATES PATENT OFFICE 2,115,053

HALOGEN CONTAINING RUBBER DERIVATIVES—SULPHIDE COMPOSITIONS

Herbert A. Winkelmann, Chicago, Ill., assignor to Marbon Corporation, Chicago, Ill., a corporation of Delaware No Drawing. Application September 23, 1935, Serial No. 41,772

18 Claims. (Cl. 106—23)

This invention relates to composition of halogen containing rubber derivatives and salts of sulfur acids, and also to products formed by the reaction of halogen containing rubber derivatives and salts of sulfur acids. More especially, it relates to rubber hydrochlorides combined with metallic sulphides.

An object of this invention is to produce new and useful resins.

Another object of this invention is to produce relatively insoluble and heat stable compositions composed mainly of rubber hydrohalides.

Other objects will become apparent on reading the specification.

In the present invention a rubber hydrohalide is mixed with a salt of a sulfur acid as, for example, a metallic sulphide, and heated. The time and temperature of heating may vary within wide limits, but should not be so high as to cause substantial disintegration. In general, temperatures from 230° F. and 260° F. are satisfactory, and the time of heating may vary from about 3 minutes to 60 minutes or longer depending on the type of the product desired.

The use of magnesium oxide, disodium phosphate, calcium oxide or other stabilizer such as described in my copending application, Serial No. 11,665, is advisable, particularly where certain metallic sulphides or sulphites are used, which in themselves are not stabilizers, or where the reaction is carried out at the more elevated temperatures and longer time of heating.

The reaction may be carried out in solution or in the substantially dry condition.

The following examples will illustrate the invention as applied to solutions:

Example I

A 5% solution of rubber hydrochloride in toluene is mixed with sodium polysulphide in an amount about equal to the amount of rubber hydrochloride. The mixture is heated at 100° C. for seven hours. A gel is formed indicating that a reaction or transformation has taken place. The product has a sulfur content of about 4.15%.

The following example illustrates the invention as applied to substantially solid mixtures of halogen containing rubber derivatives and salts of sulfur acids:

Example II

Rubber hydrochloride 100 parts by weight, sodium polysulphide 10 parts, magnesium oxide 5 parts are milled to a homogeneous mass. A black milled stock is obtained. The milled mass is then molded into block of ¼" thickness. On molding for three minutes at 230° F. there is no blowing or sweating. A black, opaque, stiff product is obtained. Similar results are obtained on molding at 260° F. for thirty minutes with, however, a slightly softer product. On molding for one hour at 260° F. a definite transformation takes place. The product changes from a black, opaque, slightly stiff mass to a bright, nearly transparent soft mass.

The admixture of 5 parts of butyr aldehyde-aniline with the above mixture gives a translucent product in a shorter time, and aids in producing a product which retains its tensile strength fairly constantly throughout long heating of, for example, 1½ hours at 260° F. Butyr-aldehyde-aniline and other rubber accelerators appear to have a useful effect on rubber hydrochloride metallic sulphide mixtures.

On carrying out the milling and heat treatment in the absence of magnesium oxide, very similar results are obtained and it is evident that the sodium polysulphide itself is a heat stabilizer of good order.

With sodium monosulphide in place of sodium polysulphide there is also some heat stabilizing effect, as evidenced by the slightness of gassing during milling.

There is less evidence of a reaction of the rubber hydrochloride and sodium monosulphide than of the polysulphide, although some kind of a combination has taken place resulting in homogeneous products. However, molding and curing at 260° F. for one hour does not give a transformation from an opaque to translucent product as with the polysulphide, although a change from a stiff to a soft product takes place. Other alkali metal sulphides such as potassium, lithium sulphide, give similar results to the sodium sulphides, and are the preferred sulphides of this invention. Other metallic sulphides, however, are operable in obtaining resinous products.

The following tables give the results in condensed form of milling, molding and curing a number of metallic sulphides: The list is not presumed to be exhaustive but is intended to be illustrative of the invention. The formula used is 100 parts rubber hydrochloride of about 30% chlorine content and 10 parts sulphide. In Table I, T represents the tensile strength in pounds per square inch. E represents the elongation in percent, and H represents the hardness in 1/100 m. m. as determined by the Pusey & Jones penetrometer. The figure underneath the elongation when given represents the set.

Table I

| Material | Molded blocks | | | | | | | | |
|---|---|---|---|---|---|---|---|---|---|
| | 3 min. at 220° F. | | | 30 min. at 260° F. | | | 60 min. at 360° F. | | |
| | T. | E. | H. | T. | E. | H. | T. | E. | H. |
| Sodium polysulphide plus MgO 5 parts | 5243 | 10 | 7 | 4130 | 30 / 13 | 8 | 1103 | 323 / 40 | 19 |
| Sodium polysulphide | 4560 | 10 | 7 | 5190 | 27 / 11 | 8 | 1747 | 393 / 43 | 43 |
| Barium sulphide | 3260 | 60 / 15 | 40 | 1635 | 485 / 19 | 22 | 1455 | 495 / 29 | 75 |
| Cadmium sulphide | 3020 | 193 / 38 | 37 | 1110 | 490 / 25 | 66 | 443 | 427 / 20 | 101 |
| Strontium sulphide | 3663 | 57 / 13 | ----- | 1660 | 523 / 21 | 28 | 777 | 420 / 22 | 81 |
| Cupric sulphide | 2753 | 117 / 27 | 24 | 1090 | 427 / 19 | 64 | 1420 | 410 / 22 | 72 |
| Calcium sulphide | 3453 | 53 / 9 | 11 | 1710 | 460 / 16 | 56 | 963 | 393 / 16 | 76 |
| Sodium monosulphide | 3400 | 73 / 14 | 20 | 2653 | 200 / 44 | 33 | 1740 | 390 / 32 | 64 |
| Stannous sulphide | | | 9 | | | 7 | | | 14 |
| Lead sulphide | 3900 | 27 / 9 | 15 | 1870 | 360 / 25 | 60 | 2190 | 85 / 23 | 64 |
| Aluminum sulphide | 1587 | 67 / 28 | 57 | 577 | 337 / 30 | 72 | ----- | ----- | ----- |
| Manganese sulphide | 3427 | 40 / 8 | 20 | 1420 | 437 / 20 | 65 | 1480 | 285 / 26 | 76 |
| Sodium polysulphide (repeat) | 5130 | 10 | 15 | 5073 | 10 | 6 | 3505 | 80 / 14 | 8 |
| Na. polysulphide 10, 3 parts butyraldehyde aniline | 6540 | 10 | 3 | 2030 | 310 / 31 | 17 | 2303 | 377 / 23 | 15 |
| Na. polysulphide 10, 5 parts butyraldehyde aniline | 4000 | 130 / 31 | 19 | 1340 | 490 / 22 | 17 | 1455 | 383 / 28 | 20 |
| Control | 5367 | 10 | 8 | 2400 | 350 | 14 | 2663 | 370 | 6 |
| Zn. sulphide 10 | 4000 | 10 | 6 | 2517 | 10 | 12 | 2100 | 10 | 11 |
| Zn. sulphide 10, MgO 10 | 4100 | 10 | 4 | 5405 | 10 | 9 | 5140 | 10 | 9 |
| Potassium sulphide | 4800 | 13 / 2 | 4 | ----- | ----- | ----- | 3100 | 410 / 28 | 13 |

Table II

| Sulphide | Gassing on mill | Color of milled stock | Molded 3 min. at 230° F. | Molded 30 min. at 260° F. | Molded 60 min. at 260° F. |
|---|---|---|---|---|---|
| Barium | Some gassing | Light brown | Lt. brown. Opaque. No blowing. Stiff. No sweating. | Med. brown. Opaque. No sweating. Fairly stiff. | Dk. brown. Opaque. Sweating. Somewhat soft. |
| Cadmium | Some gassing | Deep yellow | Deep yellow. Opaque. No blowing. Quite stiff. No sweating. | Yellow. Opaque. No sweating. Quite soft. | Yellow. Brown. Opaque. Sl. sweating. Very soft. |
| Strontium | Some gassing | Light gray-brown. | Green-brown. Opaque. No blowing. Quite stiff. No sweating. | Dk. gray-brown. Opaque. No sweating. Quite stiff. | Brown. Opaque. V. sl. sweating. Quite soft. |
| Cupric | Some gassing | Brown-black | Brown-black. Opaque. No blowing. Sl. soft. No sweating. | Black. Opaque. No sweating. Somewhat soft. | Black. Opaque. Heavy. Sweating. Sl. soft. |
| Calcium | Some gassing | Gray | Lt. green. Brown. Opaque. No blowing. No sweating. Quite stiff. | Lt. gray-tan. Opaque. No sweating. Fairly stiff. | Brown. Opaque. Sl. sweating. Quite soft. |
| Stannous | Much gas | Brown | Dk. maroon. V. sl. transparent. Sl. sweating. Stiff. Brittle. | Dk. brown. Opaque. Heavy sweating. Very stiff. Brittle. | |
| Lead | Gassed all thru milling. | Brown-black | V. dk. brown. Opaque. No sweating. Stiff. | Dk. brown. Opaque. Sl. sweating. Fairly stiff. | Brown. Opaque. No sweating. Quite stiff. |
| Aluminum | Gassed only at start. | Dark brown. | Green-brown. Opaque. No sweating. Quite stiff. | Gray-brown. Opaque. No sweating. Sl. blowing. Somewhat soft. | Dk. brown. Opaque. No sweating. Badly blown. Stuck to mold. Quite soft. |
| Manganese | Gassed only at start. | Brown-black. | Brown-black. Opaque. No blowing. No sweating. Stiff. | Brown-black. Opaque. No blowing. No sweating. Quite soft. | Brown-black. Opaque. V. sl. blowing. V. sl. sweating. Quite soft. |
| Control | Lots of gas | Brown-black. | Br. black. Translucent. No blowing. No sweating. Stiff. | Br. black. Translucent. V. sl. blowing. No sweating. Somewhat soft. | Br. black. Translucent. No blowing. No sweating. |

The zinc sulphide is apparently in a distinct class in respect to the products obtained with it and halogen containing rubber derivatives. It is apparently not a heat stabilizer. When milled with rubber hydrochloride there is evolved copious quantities of hydrogen chloride gas. The milled stock is dark brown in color, and opaque. On molding and heating at 260° F. for three minutes the product is still opaque and stiff, after 15 minutes there is heavy sweating, the product is still stiff but has become translucent, at 30 minutes it is the same, but at 60 minutes it has become light brown, has blown, and is very brittle. Evidently a reaction and transformation takes place which is different from that obtained with the other sulphides.

The exact mechanism of what takes place when rubber hydrohalides are cured with metallic sulphides is not definitely known. It is believed that the reaction is similar to a vulcanization in which the sulphur of the metallic sulphides breaks off and in its very active nascent condition reacts with the rubber hydrohalide. In the case of the zinc sulphide there may also be a cyclization of the rubber derivative.

The use of rubber accelerators apparently helps the reaction. However, the reaction may be a polymerization, or there may be simply a physical intimate fusion and no chemical reaction.

The total chlorine content of the above heat treated metallic sulphide rubber derivative composition originally containing rubber hydrochloride of about 30% chlorine preferably ranges from about 22% to 27% chlorine. The heat treated products contain both free and combined sulphur.

The invention is not limited to any theory but covers broadly compositions of halogen containing rubber derivatives and salts of sulfur acid such as metallic sulphides, whether theoretically or physically combined. The temperature and time of heating may be varied widely. Compositions of rubber hydrohalides and metallic sulphides may be produced, of course, without heating, although not the same as the products produced under the influence of heat. The products obtained with rubber hydrohalides and hydrohalides of polymerized butadiene are widely different from the products obtained with chlorinated rubber, but the invention is not limited to the use of hydrohalides but covers halides and halogenated hydrohalides.

I claim:

1. A composition of matter comprising a rubber hydrohalide and a metallic sulphide.
2. A composition of matter comprising a rubber hydrochloride and a metallic sulphide.
3. A composition of matter comprising a rubber hydrochloride and sodium polysulphide.
4. A composition of matter comprising a rubber hydrochloride and zinc sulphide.
5. As a new product, the reaction product of a rubber hydrochloride and a sodium polysulphide.
6. As a new product the reaction product of a rubber hydrochloride and zinc sulphide.
7. The method which comprises reacting a rubber hydrochloride and a metallic sulphide.
8. The method which comprises heating a rubber hydrochloride and a zinc sulphide.
9. The method which comprises heating a rubber hydrochloride and a sodium sulphide.
10. The method which comprises heating a rubber hydrochloride and sodium polysulphide at a temperature substantially above room temperature and for a sufficient time to bring about a transformation of the mass from an opaque to a translucent state.
11. A composition of matter characterized by higher heat stability than unmodified rubber hydrohalide compositions, comprising a rubber hydrochloride and a metal sulphide of basic character.
12. A composition of matter characterized by higher heat stability than unmodified rubber hydrochloride composition, comprising a rubber hydrochloride and an alkali metal sulphide.
13. Artificial masses comprising essentially a rubber hydrochloride intimately admixed with a smaller proportion of an alkali metal sulphide.
14. A plastic composition essentially comprising an intimate mixture of a rubber hydrochloride and a metallic sulphide.
15. A plastic composition essentially comprising an intimate mixture of a rubber hydrochloride and an alkali metal sulphide.
16. A plastic composition essentially comprising an intimate mixture of a rubber hydrochloride and an alkali earth metal sulphide.
17. A plastic composition essentially comprising an intimate mixture of a rubber hydrochloride and a sodium sulphide.
18. A composition of matter comprising a rubber hydrochloride, and an alkali metal polysulphide.

HERBERT A. WINKELMANN.